United States Patent [19]

Sharpless et al.

[11] Patent Number: 4,546,475
[45] Date of Patent: Oct. 8, 1985

[54] PARITY CHECKING ARRANGEMENT

[75] Inventors: Charles H. Sharpless, Wayne, Ill.; Robert W. Van Slooten, Randolph, N.J.

[73] Assignee: AT&T Bell Laboratories, Murray Hill, N.J.

[21] Appl. No.: 447,008

[22] Filed: Dec. 6, 1982

[51] Int. Cl.[4] ............................................. G06F 11/10
[52] U.S. Cl. .................................................... 371/49
[58] Field of Search ............................ 371/49, 51, 22; 364/738; 370/13

[56] References Cited

U.S. PATENT DOCUMENTS

| | | | |
|---|---|---|---|
| 4,224,681 | 9/1980 | Levine | 364/738 |
| 4,280,217 | 7/1981 | Hafer et al. | 370/63 |
| 4,296,492 | 10/1981 | Hafer | 370/14 |
| 4,346,474 | 8/1982 | Sze | 371/49 |
| 4,429,391 | 1/1984 | Lee | 371/49 |

Primary Examiner—Jerry Smith
Assistant Examiner—Mark Ungerman
Attorney, Agent, or Firm—Joseph P. Kearns; Robert O. Nimtz

[57] ABSTRACT

In a stored program controlled electronic telephone switching system transmission links are provided from a host office, provided with a central processor, to one or more remote offices, each provided with a remote processor. Data and control information are continually passed between the host office and each remote office in a digital time-division format. Data integrity is monitored through a cyclic odd and even patterned parity scheme which predetermines the parity of sequential time slots in one direction of transmission and reflects that parity pattern in the return direction of transmission between host office and remote offices. The patterned parity scheme detects hardware faults in the interface for the transmission links between host and remote offices on a continuous basis.

15 Claims, 5 Drawing Figures

FIG. 3

PARITY CHECKING ARRANGEMENT

BACKGROUND OF THE INVENTION

1. Field of the Invention

This invention relates generally to stored program controlled electronic telephone switching systems and, more particularly, to the maintenance of data and control signal integrity between a central host office in such a system and one or more remote offices.

2. Description of the Prior Art

A digital time division telephone electronic switching system (ESS) utilizing stored program control broadly comprises a central processor (CP), a message switch (MSGS), a time-multiplexed switch (TMS) and one or more interface modules (IM). The CP provides central control of all switching functions as well as memory, bulk storage and data link interfaces. The MSGS provides duplicated control and message data transfer between the CP at a Host Office and the IMs. The TMS is a time-shared space division switch providing routing paths for control and data messages in pulse-code modulation (PCM) format among the IMs. The IMs terminate telephone subscriber lines and trunks from other telephone central offices. Analog signals are converted into the PCM format within the IMs. A time-slot interchange (TSI) unit within each IM performs time-division switching while the TMS performs space division switching. The signaling and data paths between IMs and the TMS are affected through four Network, Control and Timing (NCT) links, (two of which are active) and may be implemented using fiber optic technology. An NCT link provides 256 time slots (TS), each of which contains sixteen bits sampled at a baud rate of 8000. A frame of 256 TS with 16 bits per TS has a length of 4,096 bits and the overall high-speed data rate therefore becomes 32.768 million bits per second (Mb/s).

A need has arisen to effect a connection between a host central office and a remotely located IM over a plurality of PCM transmission facilities known by the Bell System designation as T1 lines. By way of example, up to ten T1 lines, each providing twenty-four eight-bit PCM channels, are mapped into each of the active NCT links at the maximum capacity of ten T1 lines per link. 230 of the 256 available time lots in each NCT link are available for message traffic and control data. Inasmuch as data are being continually transmitted in both directions between the host and the remote offices, the integrity of the several components in the transmission facilities between the host and remote IMs can be tested continuously and the location and type of error arising assessed. A fixed alternation of parity is assigned to successive transmission channels in one direction of transmission and the same parity is repeated on successive transmission channels in the opposite direction of transmission at the interface between T1 lines and the NCT links. This pattern of parity is repeated every two frames. The pattern sent in the even-numbered frame is the inverse of that in the odd-numbered frame.

It is an object of this invention to provide an automatic fault detection parity scheme for the multiplexed interface between PCM lines and serial time-division links in a two-way data transmission system.

SUMMARY OF THE INVENTION

According to this invention, a remote switching module in an electronic telephone switching system (ESS) is placed under the control of a central processor (CP) at a host office through a plurality of pulse-code-modulation (PCM) digital transmission channels provided over a plurality of T1 carrier lines and terminating in a digital facilities interface (DFI) at a facilities interface unit (FIU) which remaps the parallel T1 carrier links into two redundant pairs of high-speed serial streams of network, control and timing (NCT) link signals. One pair is normally in active service, while the other is in backup or standby service. A structured pattern of alternate odd and even parity is interactively applied to data words in the several peripheral interface data buses (PIDB) interconnecting the DFIs and the FIU for both transmission directions such that the parity in a particular bus in one transmission direction is repeated in the same signaling channel in the return transmission direction. The automatic detection of a failure of parity, when it occurs, provides an indication of the location of the failure within the fault recovery software. This software then reconfigures the associated redundant hardware to maintain proper data transmission.

The parity pattern for each direction of transmission is predetermined and stored in read-only-memories (ROM) according to the addresses of the time slots.

In the illustrative embodiment the PCM channels in up to ten T1 links are combined in a multiplexer-demultiplexer (MUX) circuit (two redundant pairs of which are normally provided, one pair in active service and one on standby). Each T1 link, terminating in a DFI, time-division multiplexes twenty-four eight-bit words of data in a frame at a rate of eight kHz. In the FIU redundant pairs of serial data streams are formed on the NCT links from thirty-two time slot PIDBs with a sixteen-bit word, in each time slot into frames containing 256 time slots. The 24 PCM words per frame on each T1 link are formatted by the DFI into the 32 time slots of the serial streams on the PIDBs, by stuffing every fourth time slot with a prearranged idle code. Among the several PIDBs the stuffed time slots are staggered for more uniform distribution throughout the serial data streams.

The transmit ROM stores select code and assigned parity information by PIDB address for data moving from the serial stream in the NCT link to the DFI. A receive ROM stores select code, and parity information by PIDB address for data moving in the opposite direction. A single counter synchronizes the reading of each ROM with the data words being transmitted. Each ROM contains a data word of sufficient length, say, eight bits, to identify the proper PIDB and DFI, the assigned parity sense of that word, the parity of the address of the time slot and the overall parity of the data word read from the ROM.

A parity circuit is further provided for each direction of transmission to generate the assigned parities on the transmit side and to check the received parity on the receive side. Through this arrangement a continuous maintenance test is performed which can detect single hardware faults by using the patterned parity scheme recorded in the ROMs. Each DFI detects parity over the incoming time slots in the serial data stream from the NCT links. The detected parity sequence is then applied to the next frame of data that is to be returned to the serial stream from the associated DFI. The parity sequence of the next returned frame of data is checked against that of the previous transmitted parity by the MUX. When the comparison is unsatisfactory, an error register records the error occurrence and reports it to the module processor (MP).

Two types of loopback between transmit and receive transmission directions are provided to help isolate faults to a portion of the FIU or the DFI. Data can be looped back through the link interfaces to isolate parity failures to the FIU hardware or to the NCT link. A peripheral loopback can be effected across the DFI side of the FIU to isolate faults to the MUX or to the DFIs and their buses.

The FIU multiplexer-demultiplexer arrangement of this invention comprises a continuous parity checking scheme for preserving the integrity of data transversing the arrangement.

BRIEF DESCRIPTION OF THE DRAWING

This invention will be more fully appreciated from the following detailed description and the drawing in which:

FIG. 3 is a chart showing the allocation of parity bits used in the practice of this invention;

DETAILED DESCRIPTION

Figure 1:
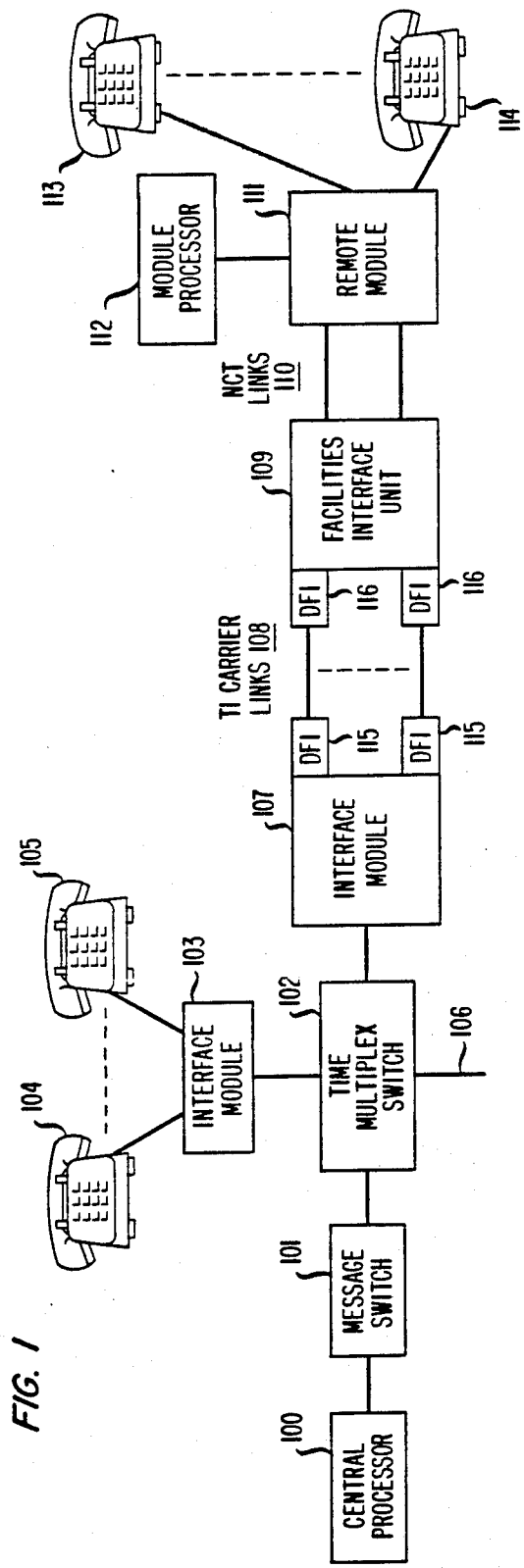
FIG. 1 is a simplified block diagram of the digital time division telephone switching system to which this invention is applicable.

FIG. 1 is a simplified block diagram of a digital time division telephone switching system to which the data integrity control arrangement of this invention is applicable. The system is designed in a modular architecture with a view to ready expansion over a wide range of subscriber loading. Specifically, there is a host office to the left of, and a remote office to the right of, T1 carrier links 108. The host office comprises central processor (CP) 100, message switch (MSGS) 101, time multiplex switch (TMS) 102 and one or more interface modules (IM), such as those designated 103 and 107. Local subscriber sets 104 and 105 are shown connected to IM 103. Stub 106 represents a network, control and timing (NCT) to a further interface module (not shown). IM 107 provides connections through T1 carrier links 108 to a remote office. Each bidirectional T1 carrier link 108 interfaces with IM 107 through an individual digital facilities interface (DFI) 115, as shown.

The remote office further comprises facilities interface unit (FIU) 109, serial network control and timing (NCT) links 110, remote module (RM) 111 and module processor (MP) 112. FIU 109 terminates T1 carrier links 108 through individual matching DFIs 116, as shown. Subscriber sets 113 and 114 are shown terminated at RM 111.

CP 100 implements a portion of the stored program aspect of the overall switching system by providing for central control, memory, bulk storage and data link interface functions. Through a combination of hardware and software operating and maintenance functions, including error and fault detection and diagnostic routines, calls are monitored and controlled.

MSGS 101 provides control message transfer between CP 100 and the IMs, such as those designated 103 and 107. Control messages convey information on which routes to select, what service to provide and the like. These messages are passed over high speed NCT digital links through the TMS to an IM.

TMS 102 is a time-shared, space division switch that interconnects the several IMs that may be located in the same central office, including the IM that is connected to a remote office. Control, data and PCM encoded voice signals are routed among the IMs by the TMS. Each IM includes a time slot interchanger (TSI) for establishing paths between time slots in the NCT digital links and the time slots assigned to the lines terminating in the IMs. IMs convert signals received from analog lines and trunks into a digital, time-division format. Where only one IM is placed in a host office, the TMS is superfluous.

Setting up a path between a line or trunk terminating on one IM and a line or trunk terminating on another IM involves finding a common time slot on one of the NCT serial links to each IM. A path is then set up through TMS 102 between the two NCT links during that time slot. Then, the TSI within each IM establishes a further path between the chosen serial link time slot and the peripheral time slot corresponding to the respective line or trunk.

RM 111 is similar to IM 103 in that it provides terminations for subscriber sets, such as those designated 113 and 114. Two NCT serial links 110 provide bidirectional serial time slots to and from the host office. RM 111 has associated with it its own MP 112 which enables it to stand alone in providing service to subscribers that are terminated directly should the link to the CP at the host office be severed. Connections between the host office and RM 111 are provided over T1 carrier links 108. FIU 109, interposed between T1 links 108 and NCT links 110, terminates T1 links 108 and formats data and control signals on these links into NCT links 110.

Figure 2:
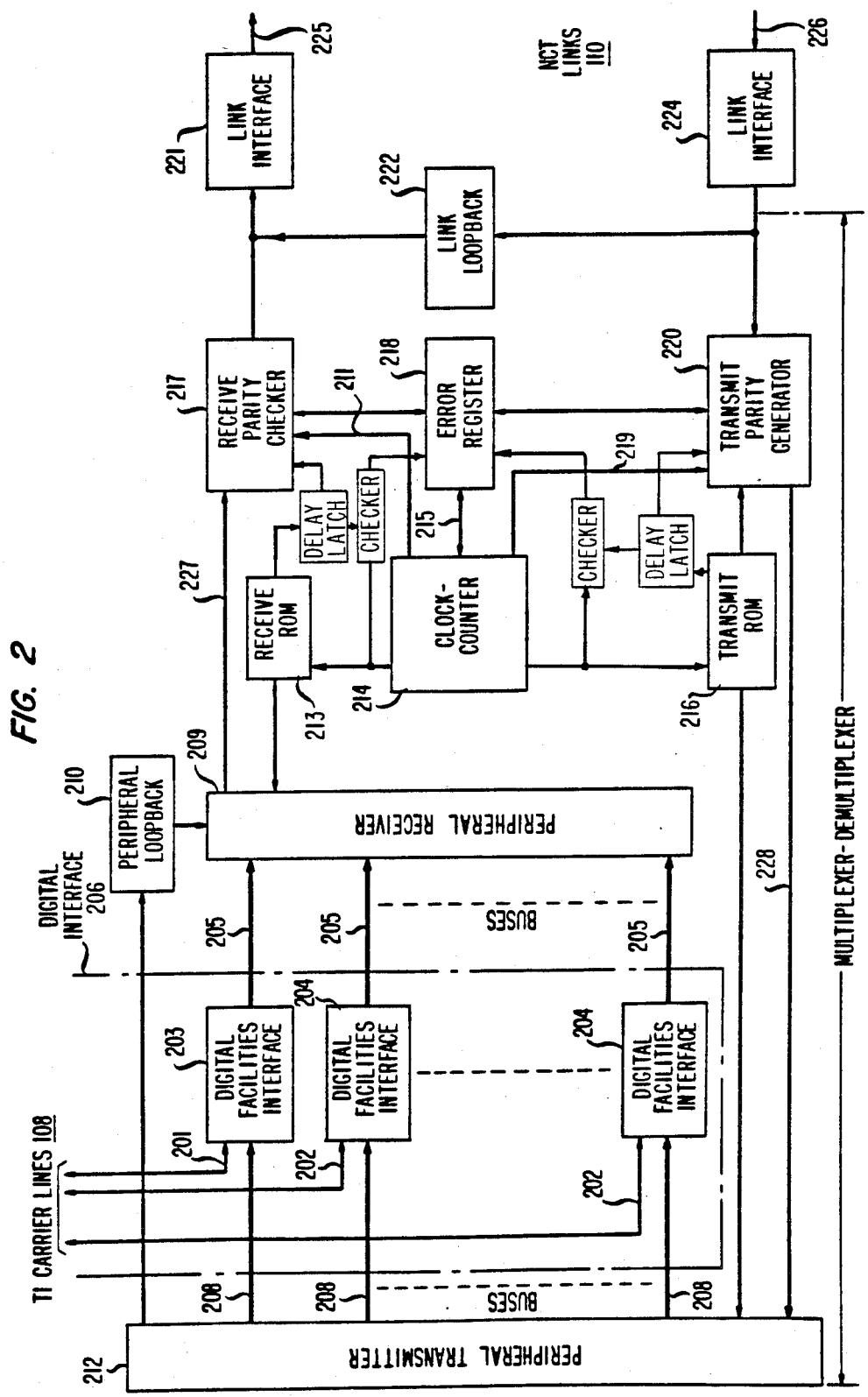
FIG. 2 is a simplified block diagram of the facilities interface circuit of this invention including a multiplexer-demultiplexer arrangement for connecting a remote switching module to a host central office in an electronic telephone switching system.

FIG. 2 is a more detailed block diagram of a portion of T1 links 108 and FIU 109. FIU 109 contains a multiplexer-demultiplexer (MUX) arrangement for the transmission facilities between the host office and a remote switching module. Typically, twenty-four digital channels of information are interchanged in time-division multiplex fashion over each of a plurality of parallel links commonly called T1 carrier lines. One of these twenty-four channels carries control signals. The other channels carry customer messages, such as, data or coded speech. The T1 digital format includes 24 time-divided 8-bit channels. The data format to FIU 109 provides, on the other hand, 32 time-divided 16-bit channels. The extra bits in the FIU channels are provided to include parity, busy/idle status and other signaling information.

Figure 5:
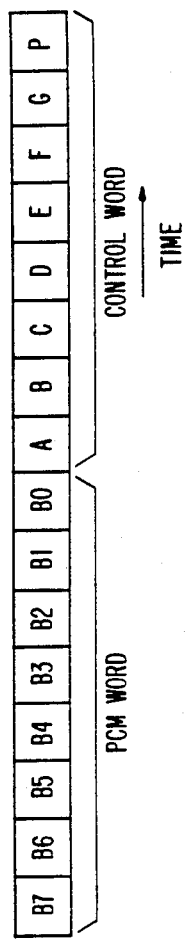
FIG. 5 is a diagram showing allocation of bits in a data word in the serial data stream of the network, control and timing link connected to a remote switching module encompassed by this invention.

NCT links 110 are of still another format. Each link contains in each direction, 256 separate 16-bit time slots at a baud rate of 8000. As shown in FIG. 5, each serial link time slot uses 8 bits B0 through B7 to carry a PCM word, 4 bits A through D for control signaling, bit E for time slot activity status, bits F and G for internal control and bit P for odd parity across the time slot. With the 8000 Hz sampling rate, 256 time slots and 16 bits per time slot, the frame length becomes 4096 bits. The overall data rate is thus 32.768 megabits per second.

The FIU of FIG. 2 interfaces with a telephone trunk facility comprising a plurality of T1 links 108 on the host office side terminated in individual digital facilities interface (DFI) units. DFIs recover data, control and timing information. Special messages sent over a derived data link contained in the special framing of each T1 link can be decoded for the purpose of establishing communication on the start up of the system between the CP at the host office and the MP at the remote office. All FIU functions are performed by redundant hardware (not shown) to increase reliability and to serve as a ready back-up to the active hardware.

As shown in FIG. 2, a plurality of T1 links 108 terminate through lines, such as those designated 201 and 202, in a plurality of DFIs (from 4 to 20) such as those designated 203 and 204. DFIs 203 and 204, previously shown in FIG. 1 as DFIs 116, are controlled through signals from MP 112 over peripheral control channels (not shown). When placed in the remote mode, 23 clear data channels and one signaling channel are provided on each T1 link. A local oscillator in each DFI is synchronized with a 1.544 MHz clock signal recovered from the host office data stream.

The several DFIs are connected over PIDB buses 206 to peripheral receiver 209 and peripheral transmitter 212. Bus 205 is the receive side of a specific one of buses 206 joining DFI 203 to peripheral receiver 209. Bus 208 is the transmit side of a specific one of buses 206 joining DFI 204 to peripheral transmitter 212. The remaining DFIs (not shown) similarly have their transmit and receive ports connected to receiver 209 and transmitter 212. Signals outgoing from the host office on the several T1 links 108 are reformatted into the 256 time slot NCT data format in peripheral receiver 209. Signals incoming from the remote office on the NCT link are time divided among the several DFIs in peripheral transmitter 212. Peripheral receiver 209 and peripheral transmitter 212 together constitute a multiplexer-demultiplexer arrangement (MUX) in the FIU.

The 24 eight-bit words of a frame on each T1 link are transformed into 256 NCT time slots of sixteen bits each for use in serial links 110. Since there are 32 time slots in a frame of the PIDB bus to carry the 24 channels of each PCM frame there are eight excess time slots in each frame.

Figure 3:
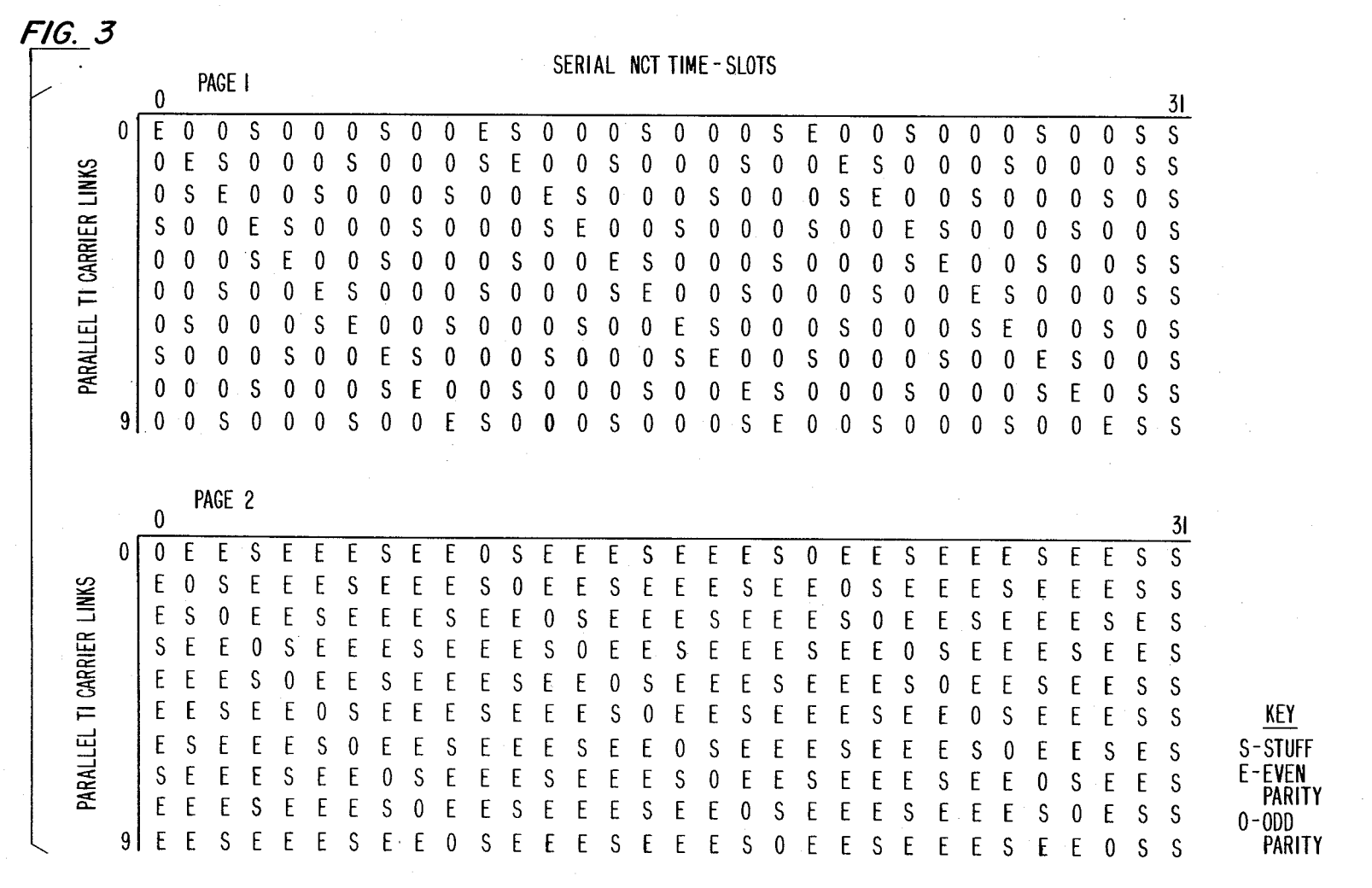

FIG. 3 is an assignment diagram showing an orderly distribution of the 24 channels of ten PCM links among successive 32-time slot frames of the serial link. The letter "s" in the several positions indicates the assignment of a stuffing idle-code word of sixteen-bit length of the form 0111111100001111. The eight-bit PCM words are extended to sixteen bits as previously mentioned in connection with FIG. 5. The P bit places assigned parity across the time slot. It is apparent that the stuffed idle codes recur in a recognizable sequence. With ten T1 links each with 24 channels per frame 240 of the 256 serial time slots in a frame are assigned, only 230 of which are available for call data. The remaining sixteen time slots are not supplied with data by the host office. Where fewer than ten T1 links are in service, idle code is inserted by the MUX into the unassigned data words, including the sixteen excess time slots.

As shown in FIG. 2, the transition from T1 carrier links 108 to NCT links 110 is effected in the FIU through a multiplexer-demultiplexer arrangement comprising DFIs 203 and 204, peripheral transmitter 212, peripheral receiver 209, peripheral loopback 210, receive read only memory (ROM) 213, transmit ROM 216, clock counter 214, receive parity checker 217, transmit parity generator 220, error register 218, link interfaces (LI) 221 and 224 and link loopback 222.

Data to be sent from NCT links 110 toward the host office connected to T1 links 108 are transmitted by LI 224 in 4 bit nibbles at an approximate eight MHz rate. There are sixteen bits in each data word as shown in FIG. 5. Each word is divided into four nibbles B7 through B4, B3 through B0, A through D and E through P. Nibbles are carried over four wire buses. The overall word rate is thus 2 MHz. Within the transmit portion of the arrangement, data are maintained in this nibble format to facilitate the provision of frame synchronization, a fixed parity test and loopback testing.

At the transmit interface data are given odd parity during normal operation. The parity bit which forces odd parity over the whole 16-bit NCT word is found in the fourth nibble as bit P. When even parity is detected, an error is reported.

Each multiplexer interfaces with its group of DFIs over PIDBs. Each PIDB transmits 32 time slots of 16 bit serial data over twisted wire pairs to and from the DFI during each serial frame. A 4 MHz bit clock and an 8 KHz sync pulse are also provided. The value of the parity bit in each 16-bit word is determined by a fixed algorithm of patterned parity indicated further in FIG. 3. Even parity is inserted into three time slots of each PIDB serial frame as shown, for example, in the 0, 10 and 20 time slot positions of the top line of FIG. 3. In the next line even parity is assigned to the 1, 11 and 21 time slot positions. This pattern is continued through the remaining lines. All the remaining time slots in active use (those not stuffed with idle code) carry odd parity. On the next frame, shown in the page 2 array of FIG. 3, the odd and even parity assignments are reversed. The assigned parity is a function both of the time slot position and the DFI address (0 to 9). The parity sequence on each PIDB is unique. Since a DFI is arranged to echo the assigned parity scheme on its next frame of data sent back to the MUX, the MUX is able to test each PIDB, a portion of each DFI and its own parity generator.

Figure 4:
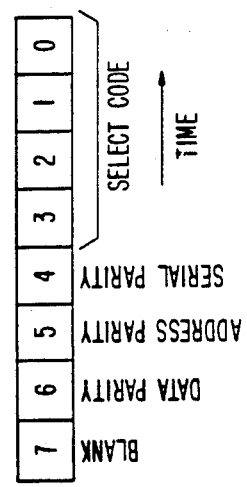
FIG. 4 is a diagram showing the allocation of bits in a data word for a read-only memory useful in implementing the parity checking scheme in the circuit of FIG. 2.

The source of the receive data and the destination of the transmit data are stored in ROMs 213 and 216, respectively. These ROMs, addressed in sequence by the time slot count value, produce a selection code, the parity value expected to be received or sent in that time slot and a bit which forces the ROM data word parity to be odd for a self check, as shown in FIG. 4. Signals directed from host office to the remote module are passed from peripheral receiver 209 to receive parity checker 217 over path 227. Receiver ROM 213 provides the assigned parity for comparison purposes. Signals directed from the remote module toward the host office are passed from transmit parity generator 220 to peripheral transmitter 212 over path 228. Transmit ROM 216 provides the assigned parity for comparison purposes.

Inasmuch as the required access time for a ROM is almost equal to the duration of a 2 MHz time slot, the resultant ROM data are stored for use in the following time slot. This delay in the use of ROM data lends itself to an address bus checking scheme. For each time slot the receive ROM stores a parity bit which, when compared with the parity of the present address bit signals in an exclusive-OR gate arrangement, must produce odd parity. The data word output for each ROM is tested for odd parity every time slot. Thus a stuck clock counter bit can be detected once every frame. If an error is detected on the receive ROM data bus or on the ROM address bus, the receive ROM bit is set to one in error register 218. Similarly, when a transmit ROM parity error occurs, the transmit ROM bit is set to one in error register 218.

All timing signals in the MUX including time slot clock-counter 214 are synchronized to 16 and 8 MHz clock signals and a negative-going sync pulse that occurs on alternate NCT link frames for the duration of an 8 MHz clock cycle.

A continuous maintenance test is performed in the MUX by means of the patterned parity scheme. The proper parity sequence is forced on the transmitted data stream by transmit parity generator 220. Each DFI detects this parity sequence over the 32 time slots on PIDB 206 from peripheral transmitter 212. This parity is used to format the parity of the next frame of data returned to the MUX by way of peripheral receiver 209. The parity received is then checked against that stored in receive ROM 213 by receive parity checker 217. If the two patterns differ, an error-source register bit in error register 218 is set and an interrupt signal is sent to the MP. The MP then initiates a diagnostic procedure to isolate the failure.

As an additional maintenance feature, the MUX can perform two types of data loopback on demand to isolate troubles within the interface hardware of FIG. 2. One loopback occurs in block 222 between incoming and outgoing link interfaces 224 and 221. A second loopback occurs in block 210 between the incoming and outgoing buses 206 to a particular DFI by way of peripheral transmitter 212 and peripheral receiver 209.

A time slot count is derived from the system clock by way of clock counter 214. This count is applied to the address bus of each ROM 213 and 216. The data access time of each ROM is only slightly less than the duration of a time slot. Therefore, ROM data is latched in a flip-flop type register, and used during the succeeding time slot. The ROM data bit definition for each time slot bus is shown in FIG. 4, as previously discussed.

While this invention has been described in terms of a specific illustrative embodiment, its principles are susceptible to modification by those skilled in the telephone switching arts within the spirit and scope of the appended claims.

What is claimed is:

1. A transmission integrity arrangement for a two-way plural channel communication system comprising
   means for interfacing with said channels,
   first and second read-only memory (ROM) means for opposite transmission directions for storing a data word for each time slot in said system transmitted to and received from said interface means, said data word including a destination selection code for each channel, the sense of parity bits for the message traversing the channel, the parity of the subsequent ROM address value and the overall parity of the ROM data word;
   counter means for controlling the read-out of the words of data from said first and second ROM means in sequence; and
   parity checking means for data received from said interface means and parity generator means for data transmitted to said interface means for producing localized indications of parity failure.

2. The transmission integrity arrangement set forth in claim 1 in which said first and second memory means are programmed with a sequence of multibit words, each word containing at least the selection code of the channel being served, the sense of the parity bit of the message data traversing the channel being served, the parity of the subsequent address of said ROM and the parity of the overall ROM data word.

3. The transmission integrity arrangement set forth in claim 2 in which said first and second memory means are preprogrammed to include two complementary sequences of multibit words directing parities of reverse sense for alternating frames of data in a given transmission direction.

4. The transmission integrity arrangement set forth in claim 1 in which the parity sense of message data for one transmission direction is reflected in the message data next returned in the opposite transmission direction in alternate frames.

5. The transmission integrity arrangement set forth in claim 1 in which said counter means synchronizes message data flow in both directions of transmission.

6. The transmission integrity arrangement set forth in claim 1 in which said parity generating means and said parity checking means responsive to said counter means provide the parity sense for words of message data in each direction of transmission through each channel in accordance with the sequences programmed into said first and second memories.

7. The transmission integrity arrangement set forth in claim 1 in which said parity checking means and said parity generating means compare the message data parity with the sense of the parity bits programmed into the respective first and second memory means for agreement and generate an error signal in the event of nonagreement.

8. The transmission integrity arrangement set forth in claim 7 further comprising an error register responsive to an error signal from said parity checking means for initiating a fault isolating test on said communication system.

9. The transmission integrity arrangement set forth in claim 8 further comprising a loopback path insertible between oppositely directed transmission directions of the several two-way channels for bypassing signals originating at a near-end of said system around a far-end thereof for fault isolation testing.

10. The transmission integrity arrangement set forth in claim 8 further comprising loopback paths insertible alternatively into either terminus between oppositely directed transmission directions of the several two-way channels for bypassing signals originating at the terminus opposite to that in which a loopback path is inserted.

11. The transmission integrity arrangement set forth in claim 1 further comprising
   first and second means each associated with one of said ROMs for temporarily storing said data words so as to introduce a predetermined delay, and
   means for comparing said parity bit of said ROM address value received from said temporary storage means with the parity bit of a subsequent ROM address in order to determine whether said counter means is functioning correctly.

12. In a multiplexer for transferring a plurality of bidirectional signals between a plurality of parallel links, each including a plurality of time-divided channels, and a pair of bidirectional serial links having first and second preprogrammed memory means storing for opposite transmission directions a word of data for each channel in such system including a selection code and parity bits for parallel channel data, and the time-slot address and the parity of the overall data word; counter means for controlling the read-out of words of data from such first and second memory means in sequence; first and second parity control means for opposite transmission directions; parity checking means and parity generating means for opposite transmission directions:

the method for maintaining continuous transmission integrity within said multiplexer comprising the steps of (a) reading a word under the control of said counter means in sequence from said first memory to direct said first parity control means to apply a predetermined parity alternating from word to word to a signal word originating in a serial link destined for a particular parallel channel;

(b) repeating the parity of the last signal received in a particular parallel channel in the next signal originating in the particular parallel channel;

(c) comparing the parity of each signal proceeding from a particular parallel channel to a particular time slot serial link with a word stored in sequence in said second memory, and (d) generating an error signal upon the failure of a comparison between a signal originating in a parallel channel and the time slot in the applicable link in said second memory.

13. The method set forth in claim 12 further comprising the step of closing a signaling loop between opposite transmission directions in a particular parallel channel for isolating faults from other parallel channels.

14. The method set forth in claim 12 further comprising the steps of closing a signaling loop between opposite transmission directions of said serial link for isolating faults from apparatus connected to said serial channels.

15. The method of claim 11 further comprising the steps of temporarily storing said data word so as to introduce a predetermined delay said data word comprising the parity bit of the address of said first or second preprogrammed memory means, and comparing said parity bit of said address with the parity bit of a subsequent address of said preprogrammed memory means in order to determine if said counter means is functioning correctly.

* * * * *